(12) United States Patent
Smith

(10) Patent No.: US 7,922,235 B1
(45) Date of Patent: Apr. 12, 2011

(54) DRAG REDUCTION SYSTEM FOR VEHICLES

(75) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 12/762,144

(22) Filed: Apr. 16, 2010

(51) Int. Cl.
*B62D 35/00* (2006.01)

(52) U.S. Cl. .................................. 296/180.2; 296/180.1

(58) Field of Classification Search ............... 296/180.1, 296/180.2
See application file for complete search history.

(56) References Cited

U.S. PATENT DOCUMENTS

| | | |
|---|---|---|
| 2,112,709 A | 3/1938 | Reynolds |
| 2,184,798 A | 12/1939 | Gracey |
| 2,184,995 A | 12/1939 | Eriksen |
| 2,243,029 A | 5/1941 | Cupit |
| 3,574,392 A | 4/1971 | Hirano |
| 3,695,674 A | 10/1972 | Baker |
| 4,063,773 A | 12/1977 | Modesette |
| 4,262,954 A | 4/1981 | Thompson |
| 4,320,919 A | 3/1982 | Butler |
| 4,357,045 A | 11/1982 | Kinford |
| 4,627,657 A | 12/1986 | Daniels |
| 4,703,970 A | 11/1987 | Gorka |
| 4,842,319 A | 6/1989 | Ziegler |
| 5,039,156 A | 8/1991 | Messmore |
| 5,082,321 A | 1/1992 | Brewer |
| 5,094,497 A | 3/1992 | Hartung |
| 5,308,134 A | 5/1994 | Stanesic |
| 5,924,756 A | 7/1999 | Homa |
| 6,276,636 B1 | 8/2001 | Krastel |
| 6,702,364 B2 | 3/2004 | Neel |
| 6,899,369 B2 | 5/2005 | Neel |
| 6,926,346 B1 | 8/2005 | Wong |
| 2004/0026953 A1 | 2/2004 | Neel |

FOREIGN PATENT DOCUMENTS

DE 3535317 A 4/1987

*Primary Examiner* — Lori L Lyjak
(74) *Attorney, Agent, or Firm* — Christensen O'Connor Johnson Kindness PLLC

(57) ABSTRACT

A drag reduction system generally comprises a pair of deflectors that conjunctively compensate for the angular designs typical of currently existing vehicles. In one embodiment, the pair of deflectors includes a first deflector positioned proximate the interface between the vertical grille and the hood, for example, near the upper end of the grille crown at the forward end of the hood and a second deflector positioned on the upper hood surface toward the rearward end of the hood, forwardly of the windshield. The first and second deflectors and function in concert, twice maneuvering an air stream to both avoid direct impact with the vehicle and to displace the stream laterally in such a manner that minimizes the amount of work energy expended in its redirection. In one example, the drag reduction system tailors the air stream around the hood and cab sections of the vehicle.

17 Claims, 6 Drawing Sheets

DRAG REDUCTION SYSTEM FOR VEHICLES

BACKGROUND

Motor vehicles, and in particular trucks, are a critical component in transporting materials, goods and people from place to place. The amount of energy required to move such vehicles depends on many factors. For instance, a substantial amount of energy is expended to overcome the resistance encountered in moving the vehicle through air. The amount of energy expended depends in large part on the aerodynamic drag force exerted on the vehicle by the air. In the field of surface transportation, and particularly in the long-haul trucking industry, even a small reduction in their aerodynamic drag results in improvements in fuel efficiency that can reduce annual operating costs significantly.

As generally known, a vehicle moving through air experiences a drag force, which may be divided into two components: frictional drag and pressure drag. Frictional drag comes from friction generated generally through the boundary layer as the vehicle passes through the air. Pressure drag results from the net pressure forces exerted as the air flows around the vehicle. The distinction between frictional drag and pressure drag is useful because the two types of drag are due to different flow phenomena. Frictional drag is typically most important for attached flows—that is, where the flow boundary layer has not separated from the vehicle surfaces, and is related to the surface area exposed to the flow. Pressure drag dominates for separated flows, and is generally related to the cross-sectional area of the vehicle facing the air stream. When the drag on vehicle is dominated by pressure drag forces, it will expend far more energy traveling through air than the same vehicle dominated by friction drag forces. It is therefore advantageous in the design of a vehicle to reduce pressure drag forces; thereby increasing the aerodynamic properties and efficiency of the vehicle.

A bluff body, such as a conventional truck hood or front section, produces significant pressure drag at typical highway speeds. One reason for the large pressure drag is the presence of a sharp angle located at a leading edge of the truck hood. More specifically, typical truck front sections include a substantially vertical front surface or grille that meets, along an upper edge, a generally horizontal hood surface. Referring to FIG. 1, a perspective view of a prior art Class 8 truck 10 showing an airstream 12 flowing over a hood 16 is depicted. The depicted air stream 12 encounters the conventionally shaped Class 8 truck 10 at the substantially vertical surface of the front surface or grille 14. It will be appreciated that for purposes of the present aerodynamic discussion, the truck's forward motion at highway speeds is equivalent to an air stream 12 having a similar but opposite velocity flowing over a stationary truck. The air stream passing over the front section, therefore, must negotiate an abrupt change in direction at the edge where the hood structure transitions from a substantially vertical orientation to a substantially horizontal orientation. As the air stream 12 turns upwardly as it negotiates the grille 14, it separates at a leading edge 16 of the hood 18, thereby forming a highly turbulent or wake region 22 of air located directly above the top surface of the hood and aft of the leading edge 16. Because of the presence of the large wake region 22 and pressure losses due to eddy formation in the wake region, drag increases on the vehicle.

Furthermore, in practical applications, the air stream 12 will include ubiquitous highway particulates, e.g. road grime, which are circulated in the eddies formed in the wake region 22. The eddy driven recirculation of the grime results in an increased rate of deposition of the particulates contained in the air stream 12 upon the hood 18 and windshield 20. This results in a high rate of road film build-up—thus impairing the driver's vision, and therefore safety, and increasing the amount of labor and stops required to keep the truck's windshield clear, resulting in inefficiency and increased costs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a front section of a vehicle is provided, comprising a hood having a forward end, a rearward end, and a top surface, a front surface positioned adjacent the forward end of the hood and generally orthogonally thereto, and an air stream control system. The air stream control system includes a first deflector positioned near an interface of the front surface and the top surface of the hood, wherein the first deflector is configured for redirecting an air stream outwardly and downwardly as it traverses rearwardly of the first deflector, and a second deflector positioned near the rearward end of the hood, wherein the second deflector is configured for deflecting the air stream laterally outwardly and diagonally upwardly as it traverses rearwardly of the second deflector.

In accordance with another aspect of the present disclosure, a drag reducing system for a vehicle is provided. The vehicle includes a vertically oriented front surface, a hood disposed in front of a windshield and having a forward end terminating near an upper end of the front surface and a rearward end terminating near the windshield. The system comprises a first deflector adapted to be mounted near the forward end of the hood. The first deflector includes a laterally extending base plate having a top surface, a bottom surface, a leading edge, and a trailing edge, and a plurality of laterally, spaced apart vanes orthogonally extending from the top and bottom surfaces of the base plate. The first deflector further includes a flange extending downwardly from the bottom surface at the trailing edge of the base plate in a substantially orthogonal manner. The system also comprises a second deflector adapted to be mounted near the rearward end of the hood. The second deflector includes a first and second symmetrical sections each having a concave contact surface facing forwardly at an angle and intersecting at a rearwardly and upwardly sloping leading edge.

In accordance with another aspect of the present disclosure, a drag reducing system for a vehicle is provided. The vehicle includes a grille, a hood disposed in front of a windshield and having a forward end terminating near an upper end of the grille. The system comprises a first deflector positionable near the forward end of the hood. The first deflector is configured for redirecting an air stream outwardly and downwardly as it traverses rearwardly along the hood. The system comprises a second deflector positioned near the rearward end of the hood. The second deflector is configured for deflecting the air stream laterally outwardly and diagonally upwardly as it traverses rearwardly of the deflector.

DESCRIPTION OF THE DRAWINGS

The foregoing aspects and many of the attendant advantages of this disclosure will become more readily appreciated by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

Embodiments of the present disclosure are directed to systems and methods for reducing the aerodynamic drag on vehicles, such as medium duty trucks, heavy duty trucks, etc. Several embodiments of the present disclosure are directed to systems and methods that utilize one or more fairings, deflectors, vanes, fins, etc., on the front section of a vehicle for reducing the aerodynamic drag thereon. Although exemplary embodiments of the present disclosure will be described hereinafter with reference to a heavy duty truck, it will be appreciated that aspects of the present disclosure have wide application, and therefore, may be suitable for use with many other types of vehicles, including but not limited to light and medium duty vehicles, passenger vehicles, motor homes, buses, commercial vehicles, etc. It should therefore be apparent that the methods and systems of the present disclosure have wide application, and may be used in any situation where a reduction in the drag forces on a bluff body is desirable. It should be noted that for purposes of this disclosure, terminology such as "upper," "lower," "vertical," "horizontal," "fore," "aft," "inner," "outer," "frontwardly," "rearwardly," etc., should be construed as descriptive and not limiting. Accordingly, the following descriptions and illustrations herein should be considered illustrative in nature, and not limiting the scope of the present disclosure, as claimed.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known parts may not have not been described in detail in order not to unnecessarily obscure various aspects of the present disclosure.

Figure 1:
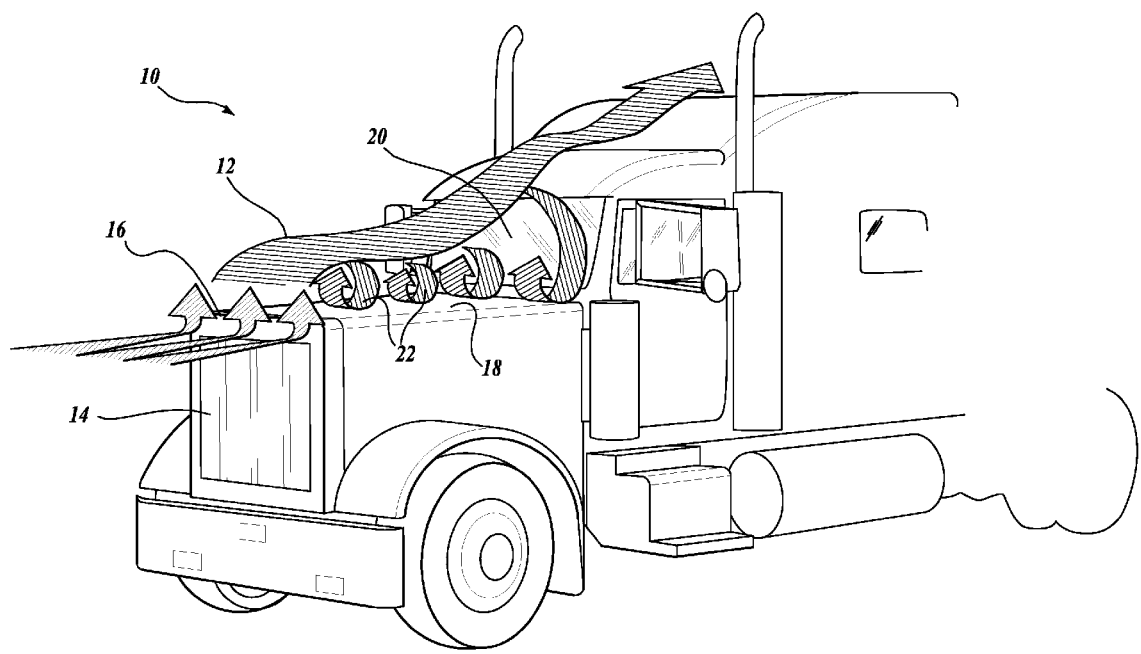
FIG. 1 is a perspective view of a prior art vehicle front section showing the flow path of an air stream over the vehicle front section during movement of the vehicle.
Figure 2:
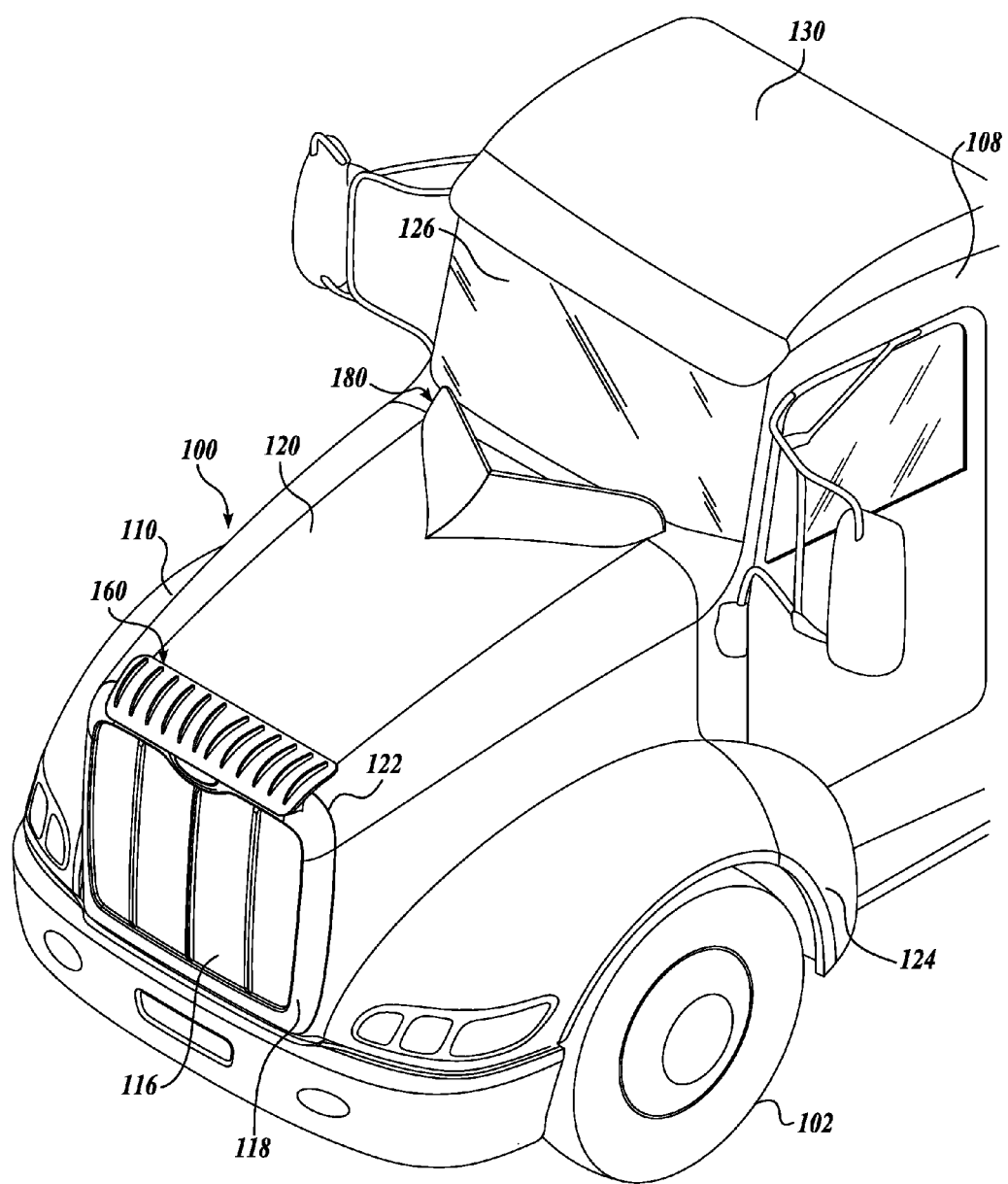
FIG. 2 is a perspective view of one example of a drag reduction system formed in accordance with aspects of the present disclosure, the system shown in this example as being associated with a heavy duty truck.

As briefly described above, embodiments of the present disclosure are directed to drag reducing systems suitable for use with a vehicle. One suitable vehicle in which the drag reducing systems of the present disclosure may be employed will now be described in more detail with reference to FIG. 2. Turning now to FIG. 2, there is shown a vehicle 100 in the form of a heavy duty truck, employing one suitable embodiment of a drag reduction system formed in accordance with aspects of the present disclosure. The vehicle 100 depicted in FIG. 2 represents one of the possible applications for the exemplary systems and methods of the present disclosure. It should be appreciated that aspects of the present disclosure transcend any particular type of vehicle.

As best shown in FIG. 2, the vehicle 100 comprises a chassis that is supported by wheels 102 connected thereto via conventional suspension assemblies (not shown). A conventional cab assembly is supportably mounted on the chassis. The cab assembly includes a cab section 108 and a front section 110 extending forwardly of the cab section 108. The cab assembly may optionally include a sleeper box (not shown) extending rearwardly of the cab section 108. The front section 110 generally includes a vertically oriented front surface or grille 116, an optional grille crown 118 that surrounds the vertical grille 116, and a generally horizontal hood 120 that generally covers a block-like shaped engine compartment housing. The front section 110 further includes fenders 124 that cover the wheels 102. The hood 120 extends rearwardly from an upper leading edge 122 of the grille crown 118 to the windshield 126 of the cab section 108. The windshield 126 extends upwardly at a gentle rearward slope to meet the roof 130 of the cab section 108.

Figure 3:
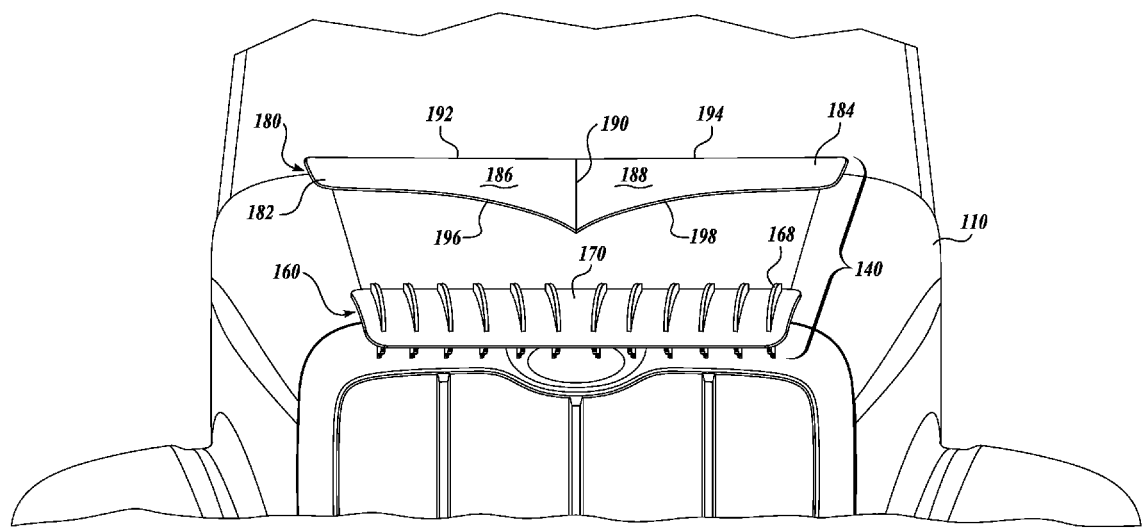
FIG. 3 is a front end perspective view of the vehicle front section shown in FIG. 2.

Referring now to FIGS. 2 and 3, there is shown one embodiment of a drag deflector system, generally designated 140, formed in accordance with aspects of the present disclosure. The drag reduction system 140 is suitable for use with a vehicle, such as the vehicle 100, described above, or other vehicles such as passenger vehicles, motor homes, etc., for improving the aerodynamic characteristics thereof. The system 140 or any combination of components hereinafter described may be installed on new vehicles or may be retrofitted on existing vehicles.

As best shown in FIGS. 2 and 3, the drag reduction system 140 generally comprises a pair of deflectors that conjunctively compensate for the angular designs typical of currently existing vehicles. In one embodiment, the pair of deflectors includes a first deflector 160 positioned proximate the interface between the vertical grille 116 and the hood 120, for example, near the upper end of the grille crown 118 at the forward end of the hood 120 and a second deflector 180 positioned on the upper hood surface toward the rearward end of the hood 120, forwardly of the windshield 126. The first and second deflectors 160 and 180 function in concert, twice maneuvering an air stream to both avoid direct impact with the vehicle and to displace the stream laterally in such a manner that minimizes the amount of work energy expended in its redirection. In the example shown in FIGS. 4 and 5, the drag reduction system 140 tailors the air stream around the hood and cab sections of the vehicle 100. Results of the system 140 in operation may include but are not limited to reduced vehicle aerodynamic drag; reduced fuel consumption; elimination of the turbulent recirculation swirl at the base of the windshield; reduced windshield turbulence and wind noise; reduced insect and debris swirling onto the windshield; and improved windshield wiper contact and performance.

Figure 5:
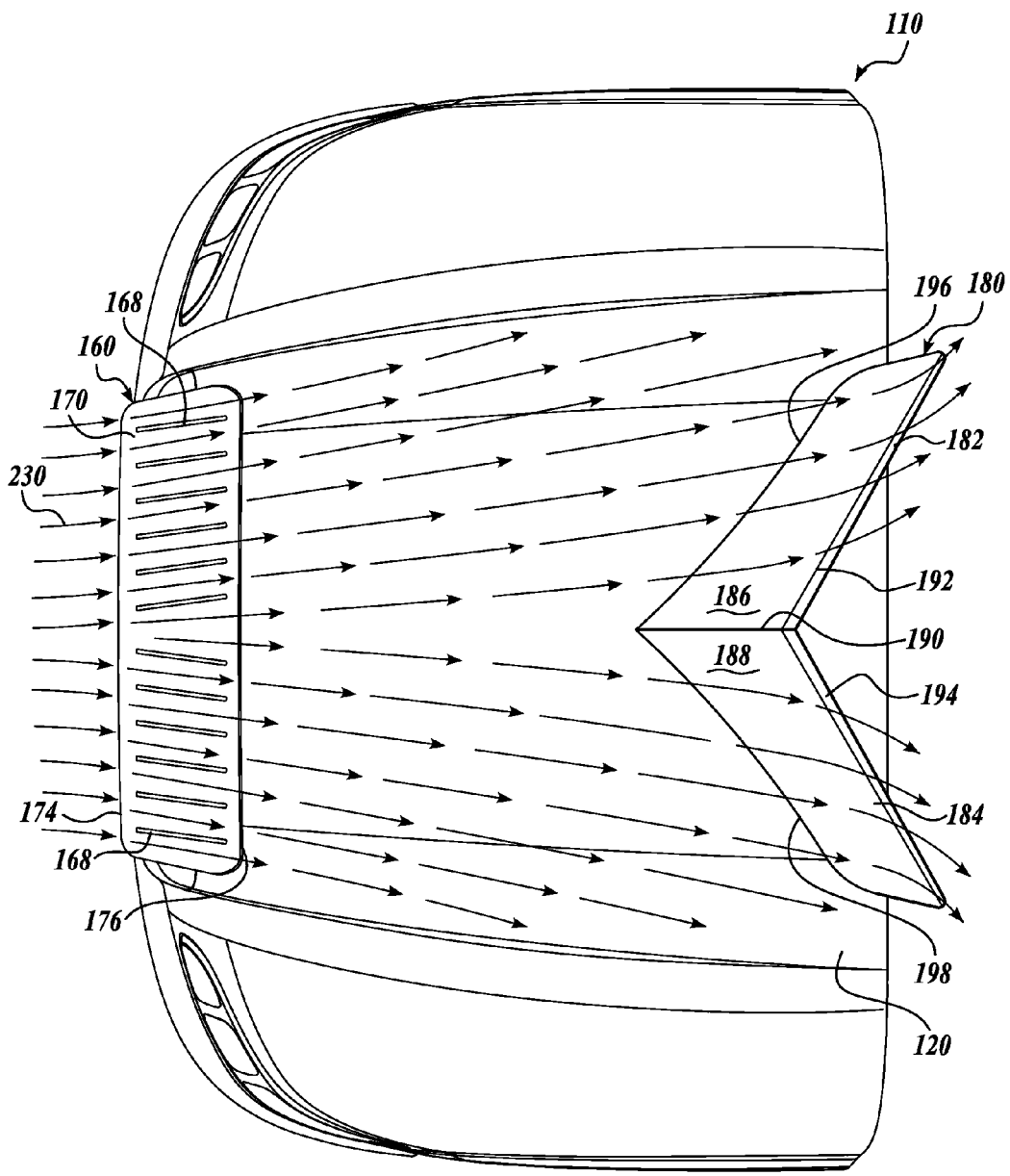
FIG. 5 is a top view of the vehicle front section shown in FIG. 4.
Figure 6:
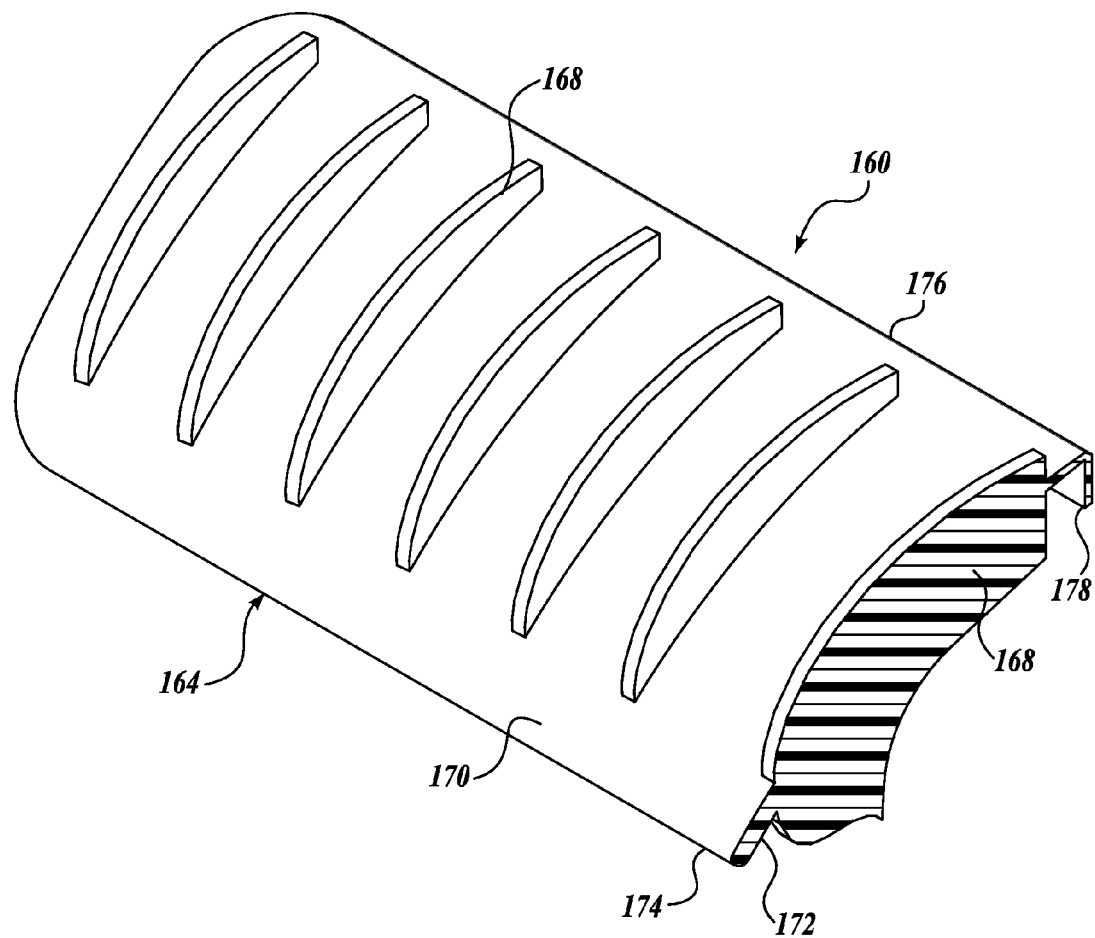
FIG. 6 is a partial cross-sectional view of one example of a first deflector formed in accordance with aspects of the present disclosure.

Referring now to FIG. 6, there is shown a perspective cross sectional view of one embodiment of the first deflector 160 of the system 140. As best shown in FIG. 6, the first deflector 160 includes a base plate 164 and plurality of guide vanes 168. The base plate 164 is constructed of a rigid material, such as metal or plastic, and defines a top surface 170, a bottom surface 172, a leading edge 174, and a trailing edge 176. In the embodiment shown, the top surface 170 and/or bottom surface 172 may be non-planar, and can be configured, for example, to have a general curvature slightly similar to the curvature of the grille crown 118 or the transition from the vertical grille 116 to the generally horizontal hood surface, as shown in FIG. 5. The front portion (including the leading edge 174) of the baseplate may be configured as a wing or airfoil (i.e., having a more streamlined cross section), if desired.

The plurality of guide vanes 168 are spaced apart and extend outwardly in a generally orthogonal manner from the top and bottom surfaces 170 and 172. The guide vanes 168 extend rearwardly along the top surface 170 and the bottom surface 172 of the base plate 164 from a position proximate the leading edge 174 to a position proximate the trailing edge 176. The spacing of the guide vanes 168 is generally constant in the example shown in FIG. 5 although other variations in spacing may be used. In one embodiment, the guide vanes 168 are configured to extend rearwardly in a linear manner and at an angle to the centerline of the vehicle, as best shown in FIG. 5. In another embodiment, the guide vanes 168 extend rearwardly in a non-linear manner. For example, the guide vanes 168 may progressively curve laterally outwardly as the guide vanes 168 extend rearwardly from the leading edge 174 to the trailing edge 176. In another embodiment, the guide vanes 168 can be configured such that the amount of curvature lessens the farther removed from the centerline of the vehicle.

The first deflector 160 further includes a downwardly turned flange 178 that extends laterally along at least a portion of, and preferably, the majority of the base plate trailing edge 176. In one embodiment, the flange 178 extends the entire length of the base plate 164. The flange 178 extends downwardly from the base plate 164 substantially orthogonally therefrom. As such, the flange 178 defines a forwardly facing surface and a rearwardly facing surface. In one embodiment, the flange 178 extends from the base plate bottom surface 172 approximately 1% to 10% of the length of the base plate 164. In use, as will be described in more detail below, the flange 178 acts like a Gurney strip, which is sometimes referred to as a "wicker bill."

The first deflector 160 is adapted to be mounted to the front section 110 of the vehicle 100. In one embodiment, the first deflector 160 is adapted to be mounted to the front section 110 of the vehicle 100 in the position shown in FIGS. 2-5. In that regard, two or more vanes 168 may include tabs, flanges, etc. (not shown) that are configured to interface with the hood, vehicle grille, grille crown, etc. The flanges may include apertures or the like for fastening to the vehicle via rivets, bolts, etc. Alternatively, the flanges may be attached via welding, heat bonding etc. It will be appreciated that the first deflector 160 can be mounted to the vehicle in any suitable manner known in the art. When mounted to the vehicle, the first deflector 160 extends laterally across a majority of the vehicle hood or vehicle grille with the leading edge 174 forward of the vehicle grille 118.

Figure 4:
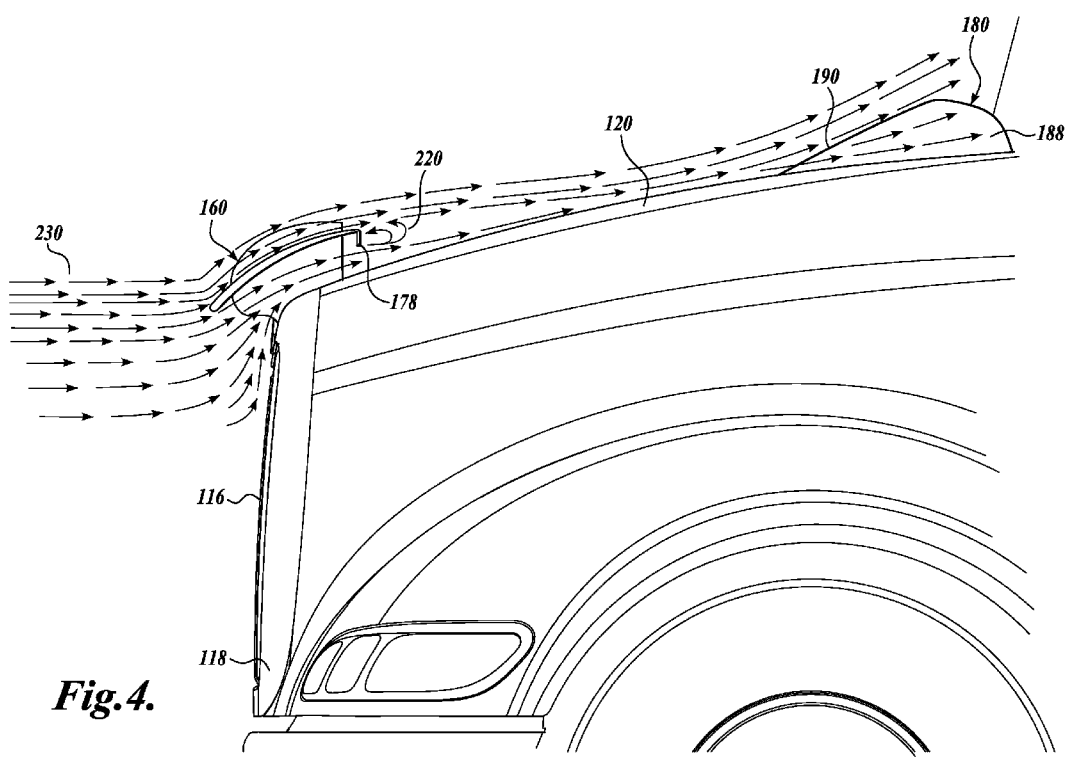
FIG. 4 is a side view of the vehicle front section shown in FIG. 3 depicting the path of an air stream affected by the drag reduction system.

In use, as the air stream 230 encounters the first deflector 160, the guide vanes 168 direct or "turn" the air stream laterally outwardly as the air stream traverses rearwardly across the top and bottom surfaces of the base plate 164, as best shown in FIGS. 4 and 5. As the air stream reaches the trailing edge 176 of the base plate 164, the flange 178 produces a "separation bubble" or wake region (containing counter rotating vortices) behind the flange 178 that causes the air flowing over the top surface 170 of the base plate 164 to stay attached to the top surface 170 of the base plate 164 longer. In other words, the presence of the flange 178 causes a zone of low pressure aft of the flange 178 that results in the air stream being pulled downwardly (i.e., a downward vector is imparted on the air stream) toward the hood top surface as it passes rearwardly of the trailing edge 176. The downward vector imparted on the air stream as a result of the wake region 220 aids in keeping the air stream somewhat attached to the hood upper surface as it moves rearwardly of the first deflector 160.

As such, the first deflector 160 causes the redirection of the upward air stream around the vertical grille 116 and/or grille crown 118, while simultaneously imparting an outward and downward vector to the air stream. In particular, the first deflector 160 functions by turning the air stream over the vertical grille 116/grille crown 118/hood 120 interface and then directing the air stream both laterally outwardly via the guide vanes 168 and downwardly via the presence of the flange 178 so as to maintain the air stream close to the hood's upper surface. As will be described in more detail below, the air stream 230 then traverses rearwardly along the hood's upper surface and strikes the second deflector 180.

Returning to FIGS. 2, 3, and 5, the second deflector 180 is configured to part the attached hood air stream both laterally outwardly with respect to the vehicle centerline and diagonally upwardly as it continues rearwardly of the front section 110 of the vehicle 100. To that end, in one embodiment, the second deflector 180 may be configured with a chevron-shaped body. As shown, the chevron-shaped body of the second deflector 180 includes symmetrically shaped driver side and passenger side sections 182 and 184 that converge at a rearwardly, upwardly sloping leading edge 190. The side sections 182 and 184 include forwardly facing concave contact surfaces 186 and 188, respectively, which extend outwardly and rearwardly from the leading edge 190. In one embodiment, the contour of the upper edges 192 and 194 of the side sections 182 and 184, respectively, is generally linear while the contour of the lower edges 196 and 198 curves gradually as it extends laterally outwardly toward the sides of the vehicle.

The second deflector 180 is adapted to be mounted to the front section 110 at a position, for example, near the rearward end of the hood 120 and just forward of the bottom edge of the windshield 126. The second deflector 180 may be mounted to the vehicle via any conventional techniques known in the art. For example, the second deflector 180 may include attachment structure in the form of, for example, vertical support brackets (not shown) affixed to the rear of the second deflector. The vertical support brackets may include tabs, flanges, etc. (not shown) that are configured to interface with the hood 120. The flanges may include apertures or the like for fastening to the vehicle via rivets, bolts, etc., or the flanges may be attached via welding, heat bonding etc. When mounted to the vehicle, the leading edge 190 of the second deflector 160 is oriented generally parallel to the longitudinal centerline of the vehicle and extends upwardly in the range of between 4-12 inches or more.

In use, as the air stream 230 traverses rearwardly along the hood upper surface after encountering the first deflector 160, the air stream 230 strikes the concave and rearwardly angled contact surfaces 186 and 188 of the second deflector 180. As the air stream strikes the sections 182 and 184 of the second deflector 180, the second deflector 180 serves to gently part the attached hood air stream both laterally outwardly (to the sides of the vehicle) and diagonally upwardly as it continues rearwardly of the front section of the vehicle. By diverting air flow predominantly laterally versus over the vehicle, a reduced amount of work energy is expended by the vehicle by virtue of not having to lift the air mass against the acceleration of gravity.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the disclosure in which an exclusive property or privilege is claimed are defined as follows:

1. A front section of a vehicle comprising:
a hood having a forward end, a rearward end, and a top surface;
a front surface positioned adjacent the forward end of the hood and generally orthogonally thereto;
an air stream control system comprising:
a first deflector positioned near an interface of the front surface and the top surface of the hood, the first deflector configured for redirecting an air stream outwardly and downwardly as it traverses rearwardly of the first deflector; and
a second deflector positioned near the rearward end of the hood, the second deflector configured for deflecting the air stream laterally outwardly and diagonally upwardly as it traverses rearwardly of the second deflector.

2. The front section of claim 1, wherein the first deflector includes a base plate having a top surface, a bottom surface, a leading edge, and a trailing edge, the first deflector further including a flange extending downwardly from the bottom surface at the trailing edge of the base plate in a substantially orthogonal manner.

3. The front section of claim 2, wherein the leading edge of the first deflector is forward of the front surface.

4. The front section of claim 1, wherein the first deflector includes a plurality of laterally, spaced apart vanes orthogonally extending from the top and bottom surfaces of the base plate.

5. The front section of claim 4, wherein the vanes extend between the leading edge and the trailing edge of the base plate.

6. The front section of claim 1, wherein the front surface is defined by a vehicle grille.

7. The front section of claim 1, wherein the front surface is defined by a combination of a vehicle grille and a grille crown.

8. The front section of claim 1, wherein the second deflector includes first and second symmetrical sections each having a concave contact surface facing forwardly at an angle toward the first deflector and intersecting at a rearwardly and upwardly sloping leading edge.

9. A drag reducing system for a vehicle having a vertically oriented front surface, a hood disposed in front of a windshield and having a forward end terminating near an upper end of the front surface and a rearward end terminating near the windshield, the system comprising:
a first deflector adapted to be mounted near the forward end of the hood, the first deflector including a laterally extending base plate having a top surface, a bottom surface, a leading edge, and a trailing edge, and a plurality of laterally, spaced apart vanes orthogonally extending from the top and bottom surfaces of the base plate, the first deflector further including a flange extending downwardly from the bottom surface at the trailing edge of the base plate in a substantially orthogonal manner; and
a second deflector adapted to be mounted near the rearward end of the hood, the second deflector including a first and second symmetrical sections each having a concave contact surface facing forwardly at an angle and intersecting at a rearwardly and upwardly sloping leading edge.

10. The system of claim 9, wherein the second deflector is chevron shaped.

11. The system of claim 9, wherein the leading edge is co-planer with a longitudinal plane that bisects the vehicle.

12. The system of claim 9, wherein the first deflector causes an air stream to move laterally outwardly and downwardly as the air stream traverses rearwardly of the first deflector.

13. The system of claim 9, wherein the second deflector deflects an air stream laterally outwardly and diagonally upwardly as it traverses rearwardly of the second deflector.

14. A drag reducing system for a vehicle having a grille, a hood disposed in front of a windshield and having a forward end terminating near an upper end of the grille, the system comprising:
a first deflector positionable near the forward end of the hood, the first deflector configured for redirecting an air stream outwardly and downwardly as it traverses rearwardly along the hood; and
a second deflector positioned near the rearward end of the hood, the second deflector configured for deflecting the air stream laterally outwardly and diagonally upwardly as it traverses rearwardly of the deflector.

15. The system of claim 14, wherein the first deflector includes a laterally extending base plate having a top surface, a bottom surface, a leading edge, and a trailing edge, and a plurality of laterally, spaced apart vanes orthogonally extending from the top and bottom surfaces of the base plate, the first deflector further including a flange extending downwardly from the bottom surface at the trailing edge of the base plate in a substantially orthogonal manner.

16. The system of claim 14, wherein the second deflector includes first and second symmetrical sections each having a concave contact surface facing forwardly at an angle and intersecting at a rearwardly and upwardly sloping leading edge.

17. The system of claim 14, wherein the first deflector includes a plurality of spaced apart vanes and a downwardly directed flange.

* * * * *

UNITED STATES PATENT AND TRADEMARK OFFICE
CERTIFICATE OF CORRECTION

| | |
|---|---|
| PATENT NO. | : 7,922,235 B1 |
| APPLICATION NO. | : 12/762144 |
| DATED | : April 12, 2011 |
| INVENTOR(S) | : J. P. Smith |

Page 1 of 1

It is certified that error appears in the above-identified patent and that said Letters Patent is hereby corrected as shown below:

| COLUMN | LINE | ERROR |
|---|---|---|
| 8 (Claim 11, | 27 line 2) | "co-planer" should read --co-planar-- |

Signed and Sealed this
Ninth Day of August, 2011

David J. Kappos
*Director of the United States Patent and Trademark Office*